(12) United States Patent
Kruglick

(10) Patent No.: US 9,565,075 B2
(45) Date of Patent: Feb. 7, 2017

(54) DISTRIBUTED USER INTERFACES AS A SERVICE

(71) Applicant: Empire Technology Development LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 288 days.

(21) Appl. No.: 14/373,026

(22) PCT Filed: Oct. 7, 2013

(86) PCT No.: PCT/US2013/063742
§ 371 (c)(1),
(2) Date: Jul. 17, 2014

(87) PCT Pub. No.: WO2015/053745
PCT Pub. Date: Apr. 16, 2015

(65) Prior Publication Data
US 2015/0365300 A1    Dec. 17, 2015

(51) Int. Cl.
| G06F 3/00   | (2006.01) |
| H04L 12/24  | (2006.01) |
| H04L 29/08  | (2006.01) |
| G06F 9/44   | (2006.01) |
| G06F 3/0484 | (2013.01) |

(52) U.S. Cl.
CPC ......... *H04L 41/5054* (2013.01); *G06F 3/0484* (2013.01); *G06F 9/4445* (2013.01); *H04L 67/025* (2013.01); *H04L 67/10* (2013.01); *H04L 67/34* (2013.01)

(58) Field of Classification Search
CPC ..................................................... G06F 9/4445
USPC ......................................................... 715/738
See application file for complete search history.

(56) References Cited

U.S. PATENT DOCUMENTS

| 5,951,694 A    | 9/1999  | Choquier et al. |
| 6,578,075 B1   | 6/2003  | Nieminen et al. |
| 8,447,820 B1   | 5/2013  | Gay |
| 9,358,460 B2 * | 6/2016  | Ahiska ................. H04L 65/105 |
| 2002/0111995 A1 | 8/2002 | Mansour et al. |
| 2002/0199096 A1 * | 12/2002 | Wenocur .............. G06Q 10/107 713/153 |

(Continued)

OTHER PUBLICATIONS

"[Twisted-Python] How to make a secure connection between two computers," posted on Feb. 12, 2007, Accessed at http://web.archive.org/web/20090325095713/http://www.twistedmatrix.com/pipermail/twisted-python/2008-February/016748.html, Accessed on Jul. 14, 2014, pp. 2.

(Continued)

*Primary Examiner* — William Titcomb
(74) *Attorney, Agent, or Firm* — Turk IP Law, LLC

(57) ABSTRACT

Technologies are generally described to send distributed user interface elements to a customer. In some examples, a virtualization server may receive an application to be provided to a customer. The virtualization server may separate the application into multiple user interface elements and encapsulate each user interface element with virtualization components for individual delivery to the customer. Subsequently, the virtualization server may then forward the encapsulated element(s) to one or more customer devices.

20 Claims, 7 Drawing Sheets

(56) References Cited

U.S. PATENT DOCUMENTS

| | | | |
|---|---|---|---|
| 2003/0120792 A1* | 6/2003 | Celik | G06F 9/4445 709/231 |
| 2008/0082603 A1 | 4/2008 | Mansour et al. | |
| 2009/0210482 A1* | 8/2009 | Wynn | G06F 9/4445 709/203 |
| 2009/0276771 A1 | 11/2009 | Nickolov et al. | |
| 2010/0009758 A1* | 1/2010 | Twitchell, Jr. | H04L 45/586 463/42 |
| 2010/0064228 A1* | 3/2010 | Tsern | G06F 3/1415 715/740 |
| 2012/0036440 A1* | 2/2012 | Dare | G06F 9/4445 715/734 |
| 2012/0239491 A1* | 9/2012 | Kruglick | G06Q 30/0255 705/14.45 |
| 2012/0254450 A1* | 10/2012 | Lejeune | H04N 21/4622 709/228 |
| 2012/0278439 A1* | 11/2012 | Ahiska | H04L 65/105 709/218 |
| 2013/0086483 A1* | 4/2013 | Vainer | G06F 9/4445 715/751 |
| 2013/0121137 A1* | 5/2013 | Feng | H04L 45/586 370/221 |
| 2014/0143674 A1* | 5/2014 | Kruglick | G06F 3/0484 715/738 |
| 2014/0173032 A1* | 6/2014 | Kruglick | H04L 67/2814 709/217 |

OTHER PUBLICATIONS

"A Comprehensive DDOS Solution," Accessed at http://www.verisigninc.com/en_US/website-availability/ddos-protection/index.xhtml, Accessed on Jul. 14, 2014, pp. 6.

"Common Gateway Interface," Accessed at http://web.archive.org/web/20131004172826/http://en.wikipedia.org/wiki/Common_Gateway_Interface, Accessed on Jul. 14, 2014, pp. 7.

"Easy, Powerful File Uploads: Connect, Store, and Process any file from anywhere on the Internet," Accessed at http://web.archive.org/web/20130910082337/https://www.inkfilepicker.com/, Accessed on Jul. 14, 2014, pp. 3.

"Environment dictionary," Accessed at http://web.archive.org/web/20130814015908/http://webpython.codepoint.net/wsgi_environment_dictionary, Accessed on Jul. 14, 2014, pp. 2.

"HAProxy: The Reliable, High Performance TCP/HTTP Load Balancer," Accessed at http://web.archive.org/web/20131005003151/http://haproxy.1wt.eu/, Accessed on Jul. 14, 2014, pp. 11.

"Node.js," Accessed at http://web.archive.org/web/20130725090717/http://en.wikipedia.org/wiki/Nodejs, Accessed on Jul. 14, 2014, pp. 6.

"Standard's perspective: MPEG DASH overview and related efforts," Accessed at http://de.slideshare.net/imtcorg/imtc-webinar-dashpg, Accessed on Jul. 14, 2014, pp. 6.

"Twisted Web in 60 seconds: CGI," Accessed at http://jcalderone.livejournal.com/tag/sixty%20seconds, Accessed on Jul. 14, 2014, pp. 17.

"What is RabbitMQ?," Accessed at http://web.archive.org/web/20131005012559/http://www.rabbitmq.com/, Accessed on Jul. 14, 2014, p. 1.

"What is the best tutorial for Python's Twisted framework?," Accessed at http://www.quora.com/What-is-the-best-tutorial-for-Pythons-Twisted-framework, Accessed on Jul. 14, 2014, pp. 2.

"Why Prolexic," Accessed at http://www.prolexic.com/why-prolexic-best-dos-and-ddos-scrubbing-centers.html, Accessed on Jul. 14, 2014, pp. 3.

"WSGI Tutorial," Accessed at http://web.archive.org/web/20130805183036/http://webpython.codepoint.net/wsgi_tutorial, Accessed on Jul. 14, 2014, pp. 2.

Dutreilh, X. et al., "From Data Center Resource Allocation to Control Theory and Back," 2010 IEEE 3rd International Conference on Cloud Computing (CLOUD), pp. 410-417 (2010).

International Search Report and Written Opinion in International Patent Application No. PCT/US2013/63742 mailed Apr. 21, 2014.

Kim, J., "Preventing Unsubscribes in Forwarded Emails," posted on Jan. 7, 2013, Accessed at http://web.archive.org/web/20130726133716/https://litmus.com/blog/preventing-unsubscribes-in-forwarded-emails, Accessed on Jul. 14, 2014, pp. 6.

Luyten. K. and Coninx, K., "Distributed User Interface Elements to support Smart Interaction Spaces," Seventh IEEE International Symposium on Multimedia, pp. 8 (2005).

Rush, J., "Walkthru of a Twisted Webserver [ID:373] (2/2)," Accessed at http://web.archive.org/web/20130917151312/http://showmedo.com/videotutorials/video?name=1080010&fromSeriesID=108, Accessed on Jul. 14, 2014, pp. 5.

Vetro, A. "The MPEG-DASH Standard for Multimedia Streaming Over the Internet," IEEE MultiMedia, vol. 18, No. 4, pp. 62-67 (2011).

"Standards' Perspective—MPEG DASH overview and related efforts", accessed at http://de.slideshare.net/imtcorg/imtc-webinar-dashpg, Published on Feb. 17, 2012, pp. 1-26.

Raiciu, C., "Multipath TCP", accessed at http://www.youtube.com/watch?v=02nBaaloFWU, Published on Jun. 4, 2012, pp. 1-3.

* cited by examiner

DISTRIBUTED USER INTERFACES AS A SERVICE

CROSS-REFERENCE TO RELATED APPLICATION

This Application is the U.S. National Stage filing under 35 U.S.C §371 of PCT Application Ser. No. PCT/US13/63742 filed on Oct. 7, 2013. The PCT Application is herein incorporated by reference in its entirety.

BACKGROUND

Unless otherwise indicated herein, the materials described in this section are not prior art to the claims in this application and are not admitted to be prior art by inclusion in this section.

As computing devices and platforms proliferate, individual users may find themselves using multiple computing devices and platforms to accomplish tasks, sometimes simultaneously. For example, a user may have available a desktop computer, a laptop computer, a tablet computer, and/or a smart phone, and may use one or more of the different devices depending on the situation. At the same time, applications provided via a network or from remote locations are becoming more widespread. As a result, in some situations a user may wish to distribute the user interface elements of a particular network-provided application across different devices.

Distributed user interface (DUI) for mobile and cloud applications is a potentially complex achievement that involves both user-side and server-side components. Moreover, specific changes may be needed in infrastructure for DUI content like additional code for each element, potentially holding many sessions per single user and application such that a datacenter optimized for DUI may be differently equipped compared to a conventional datacenter. Conventional datacenters typically do not provide DUI as a specialized service that can focus on and maintain DUI-centered functions and infrastructures.

SUMMARY

The present disclosure generally describes techniques to provide distributed user interfaces as a service.

According to some examples, a method is provided to send distributed user interface controls to customers. The method may include receiving an application to be provided to a customer, separating the application into multiple user interface controls, encapsulating at least one of the user interface controls by packaging it with at least one virtualization component, and sending the encapsulated user interface control(s) to a first device associated with the customer.

According to other examples, a system is provided to send distributed user interface controls to customers. The system may include a memory configured to store application user interface data and a virtualization server coupled to the memory. The virtualization server may be configured to receive an application to be provided to a customer, separate the application into multiple user interface controls, encapsulate at least one of the user interface controls by packaging it with at least one virtualization component, and send the encapsulated user interface control(s) to a first device associated with the customer.

According to further examples, a virtualization server is provided to send distributed user interface controls to customers. The server may include a processing module and an active forwarding module. The processing module may be configured to receive an application to be provided to a customer, separate the application into multiple user interface controls, and encapsulate at least one of the user interface controls by packaging it with at least one virtualization component. The active forwarding module may be configured to send the encapsulated user interface control(s) to a first device associated with the customer.

According to yet further examples, a computer readable medium may store instructions to send distributed user interface controls to customers. The instructions may include receiving an application to be provided to a customer, separating the application into multiple user interface controls, encapsulating at least one of the user interface controls by packaging it with at least one virtualization component, and sending the encapsulated user interface control(s) to a first device associated with the customer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
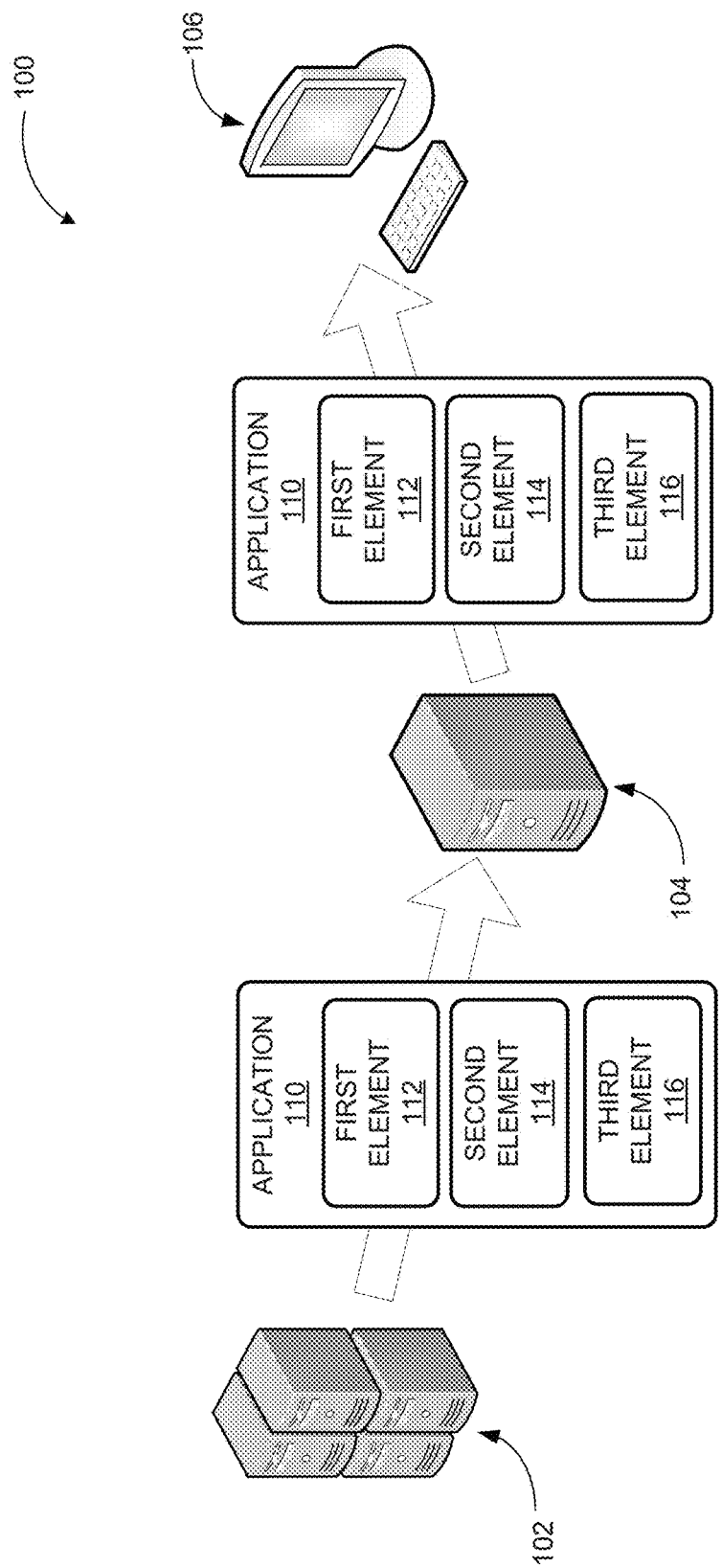
FIG. 1 illustrates an example system to send an application to a customer.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to distributed user interfaces that may be provided as a service.

Briefly stated, technologies are generally provided to send distributed user interface elements to a customer. In some examples, a virtualization server may receive an application to be provided to a customer. The virtualization server may separate the application into multiple user interface elements and encapsulate each user interface element with virtualization components for individual delivery to the customer. Subsequently, the virtualization server may then forward the encapsulated element(s) to one or more customer devices.

A datacenter, as used herein, refers to an entity that hosts services and applications for customers through one or more physical server installations and one or more virtual machines executed in those server installations. Customers of the datacenter may be organizations that provide access to their services for multiple users. One example configuration may include an online retail service that provides retail sale services to consumers (users). The retail service may employ multiple applications (e.g., presentation of retail goods, purchase management, shipping management, inventory management, etc.), which may be hosted by one or more datacenters. Thus, a consumer may communicate with those applications of the retail service through a client application such as a browser over one or more networks and receive the provided service without realizing where the individual applications are actually executed. This scenario contrasts with configurations where each service provider would execute their applications and have their users access those applications on the retail service's own servers physically located on retail service premises. One result of the networked approach described herein is that customers like the retail service may move their hosted services/applications from one datacenter to another without the users noticing a difference or may assemble a final user offering from the services of multiple datacenters.

FIG. 1 illustrates an example system to send an application to a customer, arranged in accordance with at least some embodiments described herein.

As shown in a diagram 100, an application provider 102 may provide an application 110 to a customer device 106 via a server 104. For example, the application 110 may be a cloud-based, web-based, or network-based application, and the intermediate server 104 may be an internet service provider, a datacenter, or other network server. The application provider 102 may provide the application 110 to the server 104, which in turn may provide the application 110 to the customer device 106. As depicted in the diagram 100, the application 110 may have or be associated with one or more components or elements. For example, the application 110 may include a first element 112, a second element 114, and a third element 116. Application elements may include user interface controls (e.g., buttons, input fields, menus, etc.) or elements for displaying content.

As discussed above, in some situations a customer may wish to distribute the different elements of the application 110 across different customer devices. For example, if the application 110 is a web browser, the customer may wish to have web content be displayed on a desktop computer monitor and have web browsing controls on a smartphone or tablet computer. Similarly, if the application 110 is an image editing application, the customer may wish to have the image being edited displayed on a large touch-enabled monitor or tablet and image editing controls on a smaller, touch-enabled device. At the same time, the application provider 102 may not wish to take the extra effort to repackage the application 110 to provide this element distribution capability, and may prefer to provide the application 110 as is.

To address the concerns of the customer and the application provider 102, in some embodiments, the server 104 may function as a virtualization server. The virtualization server may take the application 110 from the application provider 102, separate the application 110 into multiple application elements, and provide the separated application elements to the customer through download, one or more network sessions, or similar techniques. In some embodiments, the virtualization server may be a proxy server and/or implement a Web Server Gateway Interface (WSGI) layer module that resides between the application provider 102 and the customer. The virtualization server may be located at a datacenter or at another individual entity (e.g., a separate company providing application element encapsulation and distribution services).

Figure 2:
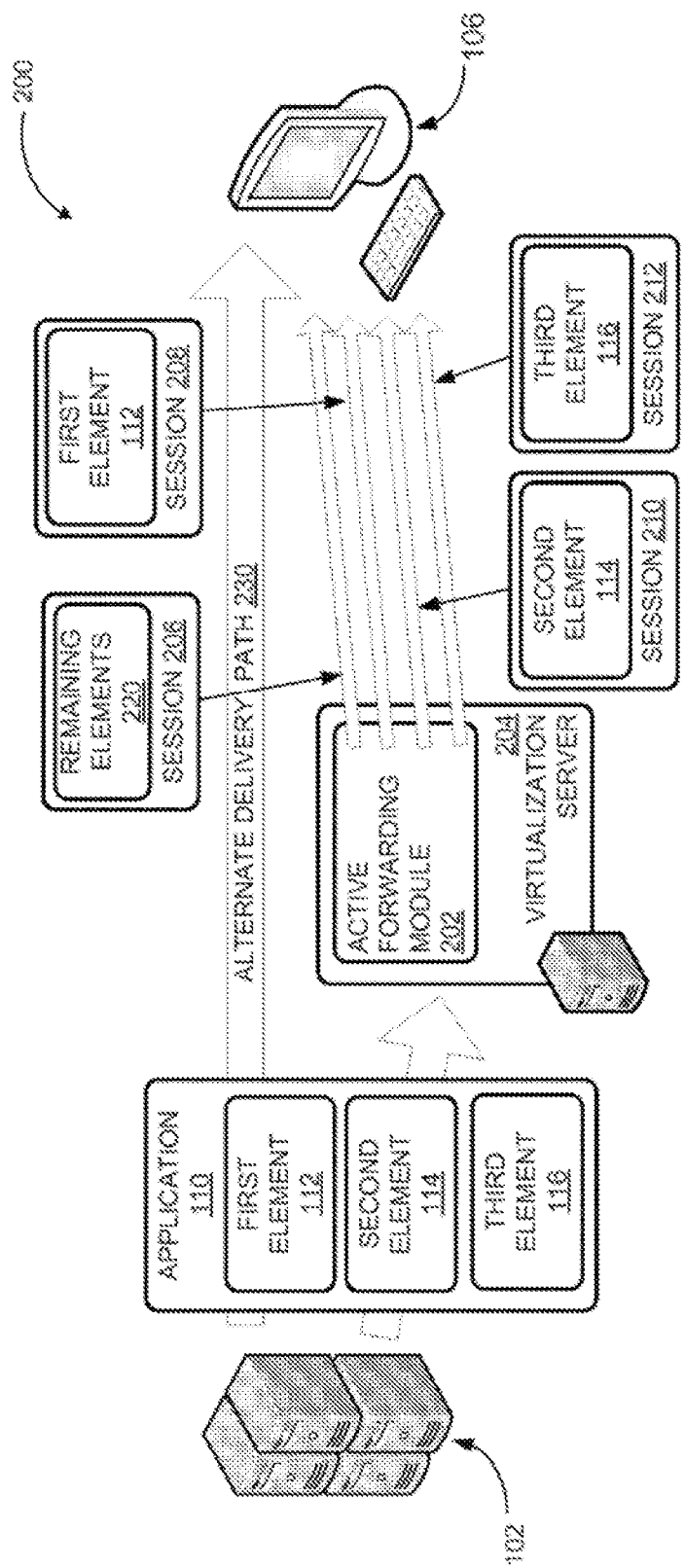
FIG. 2 illustrates an example system to separate an application into elements, encapsulating the elements, and sending the encapsulated elements to a customer.

FIG. 2 illustrates an example system to separate an application into elements, encapsulating the elements, and sending the encapsulated elements to a customer, arranged in accordance with at least some embodiments described herein.

As shown in a diagram 200, and similar to the diagram 100, the application provider 102 may provide the application 110 containing the first element 112, the second element 114, and the third element 116 to a virtualization server 204. The virtualization server 204 may then separate the application 110 into the first element 112, the second element 114, the third element 116, and remaining elements 220 of the application 110. The virtualization server 204 may be able to detect the individual elements 112-116 and the remaining elements 220 based on their associated properties and descriptors in the application 110. An application element (e.g., a menu element) may have particular identifiers or functional code associated with the application in general and/or the application element in particular. In some embodiments, the application 110 may include inactive indicator tags (e.g., extensible markup language 'XML' tags) at appropriate locations of application code to assist in the separation of the individual elements 112-116. For example, the application provider 102 may insert the indicator tags into the application 110 before providing the application 110 to the virtualization server 204. In some embodiments, the virtualization server 204 may generate the indicator tags based on properties associated with the application 110. For example, the virtualization server 204 may insert indicator tags into the application 110 based on bounding boxes surrounding individual elements in the application 110, or based on boundaries delineating user interface controls in the application 110.

After the application 110 has been separated as described above, the virtualization server 204 may then encapsulate one or more of the first element 112, the second element 114, the third element 116, and the remaining elements 220. The virtualization server 204 may perform the encapsulation by packaging the separated elements with one or more virtualization components such as headers associated with the application 110 that provide information (e.g., formatting, structures, dependencies, code, etc.) for execution of the application 110 at a customer device. For example, the virtualization server 204 may encapsulate each of the individual elements with a copy of these headers. In some embodiments, the virtualization server 204 may also add virtualization controls to enable the separated elements to be moved. For example, the virtualization server 204 may inject code into an encapsulated element to provide a menu or other control that allows a customer to move the element between different devices.

An active forwarding module 202 at the virtualization server 204 may then be used to transmit the encapsulated elements to the customer device 106. In some embodiments, each encapsulated element to be transmitted to the customer device 106 may be transmitted in a separate network session. For example, the remaining elements 220 may be transmitted in a session 206, the first element 112 may be transmitted in a session 208, the second element 114 may be transmitted in a session 210, and the third element 116 may be transmitted in a session 212. In some embodiments, although individual application elements may be provided to the customer device 106 in individual sessions, the application provider 102 may still provide the application 110 and the associated elements 112-116 to the virtualization server 204 in a single session. As a result, the application provider 102 may not have to modify or adjust the application 110 and the associated elements 112-116 to take advantage of the encapsulation and forwarding capabilities of the virtualization server 204. In some embodiments, the application provider 102 may not even be aware that the virtualization server 204 is encapsulating and forwarding individual elements of the application 110.

The customer device 106 may then receive and render or display the encapsulated elements. In some embodiments, the customer device 106 may render the encapsulated elements based on information associated or included with the encapsulated elements. For example, the virtualization server 204 may render the application 110 and the elements 112-116 locally and capture the appearance of the rendered application 110 and the elements 112-116 (including the appearance and locations of any user interface controls). The virtualization server 204 may then package virtualization components (described above) with the encapsulated elements that cause the encapsulated elements to be rendered at the customer device 106 according to the captured appearance/location information. For example, the encapsulated elements may be rendered in frames at the customer device 106 to preserve the formatting and appearance of the application 110 and the associated elements 112-116. In some embodiments, the virtualization component(s) in the encapsulated elements may be configured to detect the interface type associated with the customer device 106 (e.g., input type, screen size, etc.) and/or include rendering instructions for the customer device 106, for example based on the interface type.

In some embodiments, a customer of the datacenter may be able to choose whether to use the separation/encapsulation service provided by the virtualization server 204. For example, the customer may be able to toggle an option or control at the customer device 106 provided by the application provider 102 and/or the virtualization server 204 that selects whether the application 110 is separated and/or encapsulated. In some embodiments, the application provider 102 and/or the virtualization server 204 may be able to determine whether or not to provide the separation/encapsulation service based on detected customer usage and/or login characteristics. For example, the application provider 102/virtualization server 204 may query the customer to determine whether separation/encapsulation services are desired when the customer executes the application simultaneously on multiple devices. As another example, the virtualization server 204 may query the customer to determine whether its services are desired when it detects that the customer is logged in to on multiple devices. In some embodiments, the application provider 102/virtualization server 204 may provide the separation/encapsulation service automatically upon detecting particular customer usage or login characteristics, such as those described above. For example, when the customer executes a touch-enabled application while logged in on a desktop computer and a tablet computer, the application provider 102/virtualization server 204 may automatically send touch-based controls of the application to the tablet computer.

In response to determining that the separation/encapsulation service is not to be provided (either via a customer selection or an independent determination), the virtualization server 204 may not provide the encapsulated elements. Instead, the virtualization server 204 may instruct the application provider 102 to provide the application 110 and its associated elements 112-116 via an alternate delivery path 230. For example, the application provider 102 may provide the application 110 directly to the customer device 106 or through some other intermediary. The alternate delivery path may also be used to deliver certain resources unaffected by the virtualization server to the elements of the application that have been delivered through the virtualization server. For example, images that will be used by the various elements without modification may be delivered by the alternate delivery path to reduce bandwidth traffic of the virtualization server. Where necessary, the virtualization server may add cross origin resource sharing information as part of the modifications to the elements to facilitate delivery of resources through one or more alternate delivery paths 230.

Figure 3:
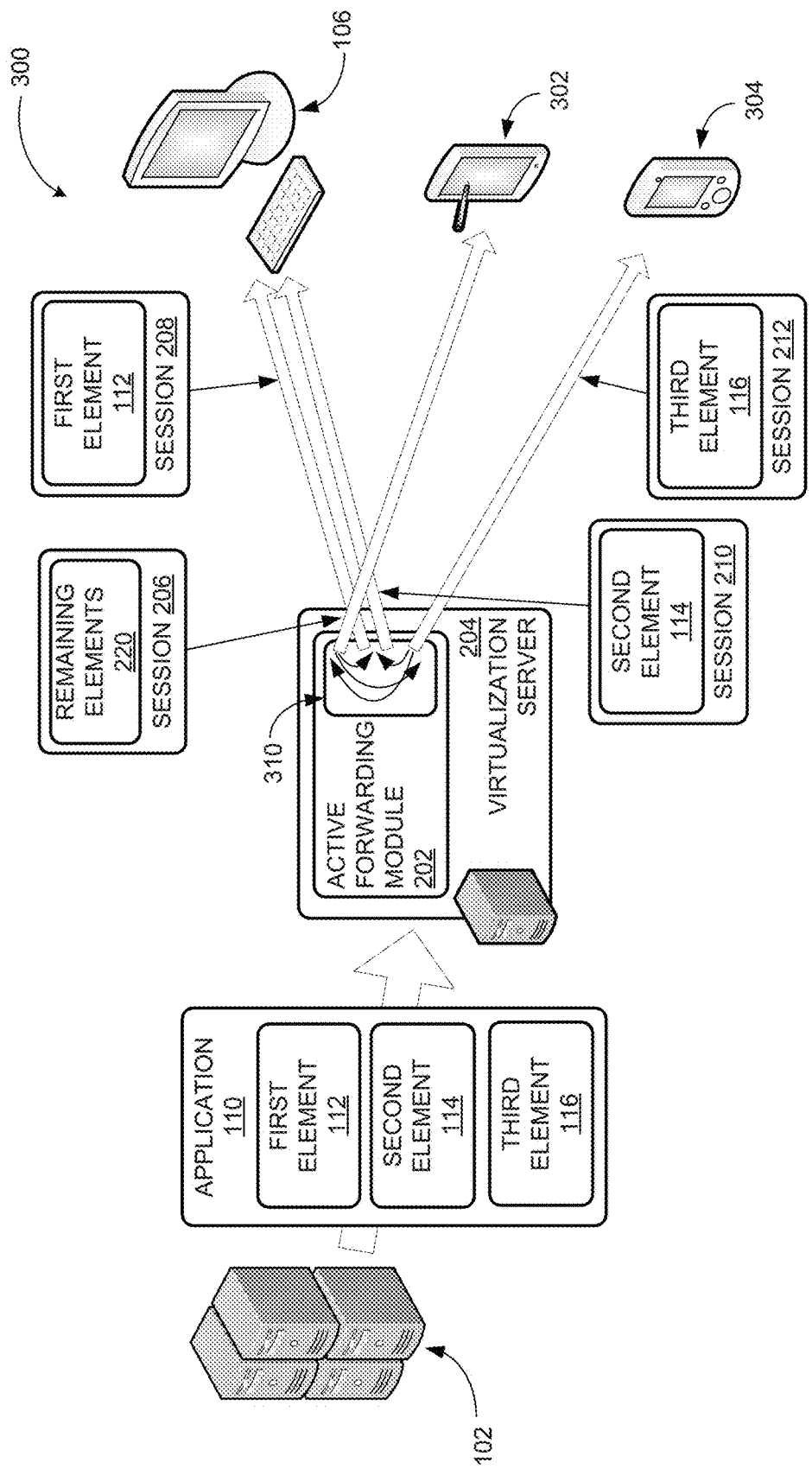
FIG. 3 illustrates the example system of FIG. 2 where encapsulated application elements may be sent to different customer devices.

FIG. 3 illustrates the example system of FIG. 2 where encapsulated application elements may be sent to different customer devices, arranged in accordance with at least some embodiments described herein.

As shown in a diagram 300, the application provider 102 may provide the application 110 and the associated elements 112-116 to the virtualization server 204, which in turn separates, encapsulates, and sends the different application elements to a customer. As described above, in some embodiments a customer may wish to display different elements of a particular application on different devices. For example, instead of parsing the elements (112-116 and 220) on the customer device 106, the customer may wish to have the remaining elements 220 rendered on a second customer device 302 and the third element 116 rendered on a third customer device 304. Since each of the application elements may be encapsulated separately and provided to the customer in separate sessions, as described above in FIG. 2, the active forwarding module 202 may transfer the sessions that correspond to the particular elements to the desired devices. For example, the active forwarding module 202 may transfer the session 206 with the remaining elements 220 to the second customer device 302 and the session 212 with the third element 116 to the third customer device 304.

In some embodiments, the active forwarding module 202 may transfer a session to a different device by modifying a destination associated with the session. For example, the destinations of the sessions 206 and 212 may originally be associated with the user device 106. The customer may then request to have the remaining elements 220 and the third element 116 rendered on the second customer device 302 and the third customer device 304, respectively. In response, the active forwarding module 202 may modify the destination of the session 206 to that of the second customer device 302 and may modify the destination of the session 212 to that of the third customer device 304. In some examples, a session may be transferred to another device using a temporary uniform resource locator (URL) and/or via an application on the other device. For example, the virtualization server 204 may send a temporary URL to the customer, as text, QR code, Bluetooth data, etc, which, when opened by the customer on the other device, may cause the session to be transferred to the other device. As another example, an application executing on the other device may receive the session from the virtualization server 204 in response to a session transfer request from the customer or in response to the customer starting or logging in to the application. Virtualization components may be added or changed associated with the transfer for improved rendering at the new device or destination.

In some embodiments, the application 110 may be configured such that different elements 112-116 and the remaining elements 220 interact with each other at the customer device 106. For example, the application 110 may specify a local variable stored at the customer device 106 that affects the elements 112-116 and the remaining elements 220. To address these situations, the virtualization server 204 may be configured to detect local variables in the application 110 during the separation and encapsulation process and to replace any detected local variables with event-type variables. For example, event-type variable versions of a local variable in application 110 may be included (e.g., as a virtualization component) in each of the encapsulated elements 112-116 and the remaining elements 220. An intra-application forwarding module 310 in the active forwarding module 202 may then be configured to receive changes to an event-type variable associated with one encapsulated element and forward the changes to the other encapsulated elements. For example, when an event-type variable associated with the third element 116 being rendered on the third customer device 304 is modified, the intra-application forwarding module 310 may receive the modification, for example through a publish-subscribe model in which the intra-application forwarding module 310 is notified of event-type variable changes. Subsequently, the intra-application forwarding module 310 may forward the modification to the first element 112 and the second element 114 rendered at the customer device 106 and the remaining elements 220 rendered at the second customer device 302. The first and second elements 112/114 and the remaining elements 220 may then modify the corresponding event-type variables at their devices (the customer device 106 and the second customer device 302, respectively) accordingly. In some embodiments, the intra-application forwarding module 310 may limit the extent to which modifications are forwarded. For example, the intra-application forwarding module 310 may limit the number of elements a particular modification can be forwarded to and/or the number of times a particular modification can be forwarded. The intra-application forwarding module 310 may also limit the possible forwarding destinations, for example not allowing modifications to be forwarded to the application provider 102 or to particular encapsulated elements.

As discussed above, the encapsulated elements may include virtualization components with rendering instructions for customer devices. In some embodiments, the virtualization components may cause a customer device to display an encapsulated element differently based on whether the encapsulated element has been forwarded to another device. For example, the encapsulated element may be displayed in one way on an original device and may be displayed another way when forwarded from the original device to a different device. In other embodiments, the virtualization components may cause a customer device to display an encapsulated element differently based on whether the customer device has a secure connection. For example, the virtualization components may cause a customer device that lacks a secure connection to display only some of the encapsulated element, to restrict some of the encapsulated element functionality, or even prevent the customer device from displaying the encapsulated element.

Figure 4:
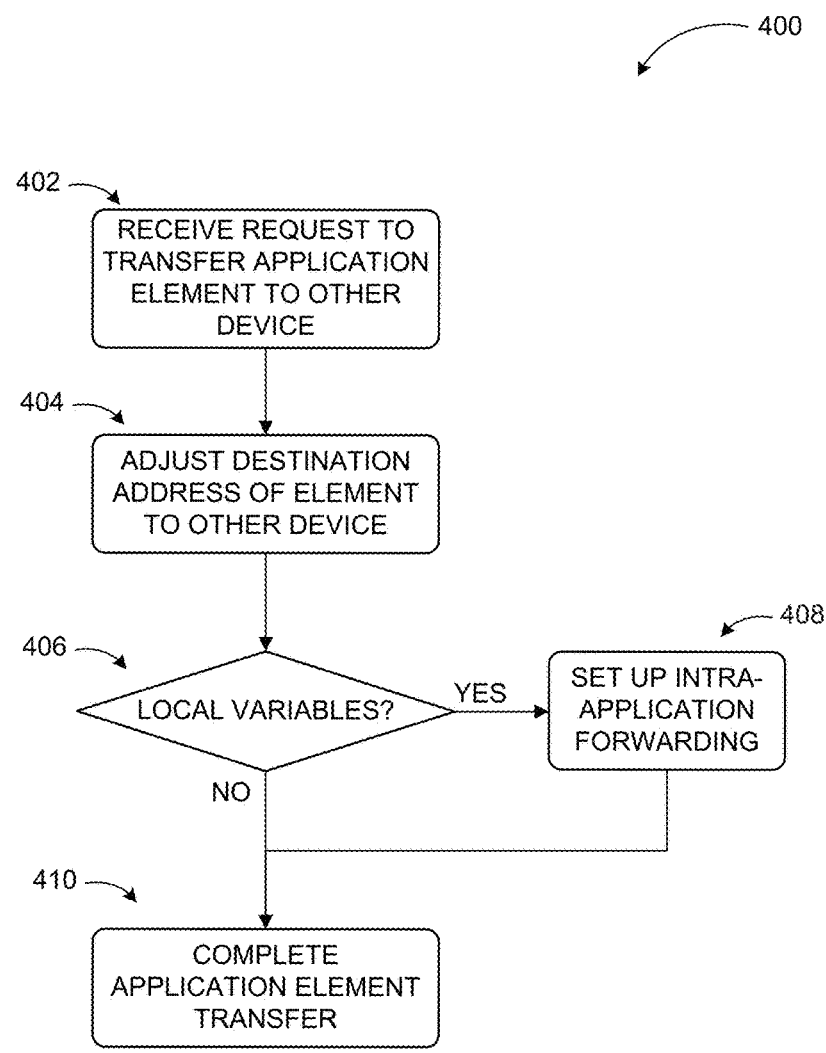
FIG. 4 illustrates an example process of sending an encapsulated application element to a different customer device.

FIG. 4 illustrates an example process 400 of sending an encapsulated application element to a different customer device, arranged in accordance with at least some embodiments described herein.

The process 400 may begin at an operation 402, where a virtualization server (e.g., the virtualization server 204) may receive a request from a customer to transfer an encapsulated application element (e.g., the third element 116) to another device (e.g., the third customer device 304). For example, the customer may select a different rendering destination for the element via an application menu, or may send the request from the other device. At an operation 404, the virtualization server may change the destination of the application element to that of the other device. For example, the virtualization server may modify a destination of a session (e.g., the session 212) associated with the element. Subsequently, at an operation 406, the virtualization server may determine whether any local variables are associated with the transferred element. In response to determining that no local variables are associated with the transferred element, the virtualization server may then complete the transfer of the element at an operation 410. On the other hand, in response to determining that local variables are associated with the transferred element, the virtualization server may proceed to set up intra-application forwarding as described above at an operation 408. Subsequently, the virtualization server may complete the transfer of the element at the operation 410.

Figure 5:
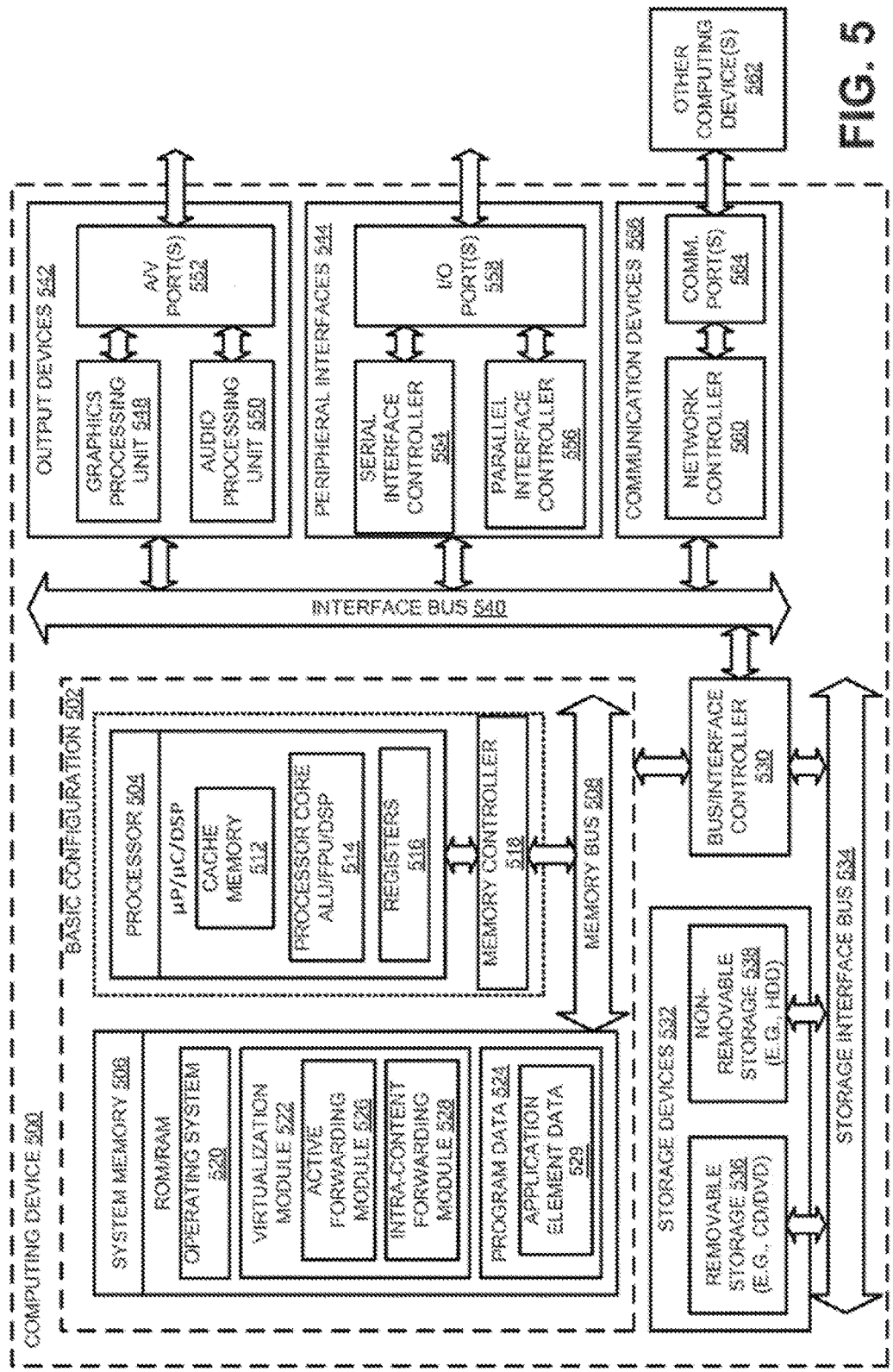
FIG. 5 illustrates a general purpose computing device, which may be used to send distributed user interface elements to a customer.

FIG. 5 illustrates a general purpose computing device, which may be used to send distributed user interface elements to a customer, arranged in accordance with at least some embodiments described herein.

For example, the computing device 500 may be used to separate, encapsulate, and distribute user interface elements as described herein. In an example basic configuration 502, the computing device 500 may include one or more processors 504 and a system memory 506. A memory bus 508 may be used to communicate between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations, the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a virtualization module 522, and program data 524. The virtualization module 522 may include an active forwarding module 526 to send encapsulated elements and an intra-content forwarding module 528 to coordinate between different encapsulated elements as described herein. The program data 524 may include, among other data, application element data 529 or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Figure 6:
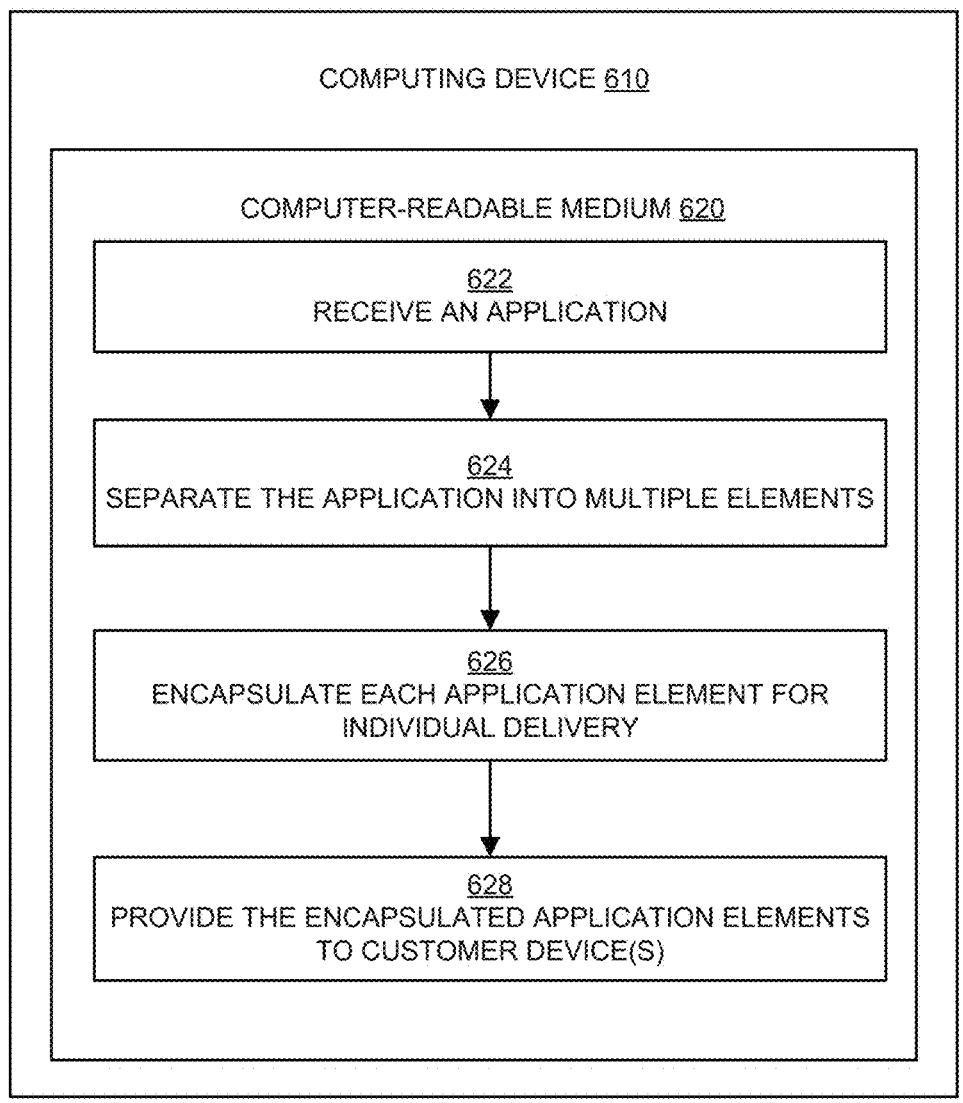
FIG. 6 is a flow diagram illustrating an example method to send distributed user interface elements to a customer that may be performed by a computing device such as the computing device in FIG. 5.

FIG. 6 is a flow diagram illustrating an example method for sending distributed user interface elements to a customer that may be performed by a computing device such as the computing device in FIG. 5, arranged in accordance with at least some embodiments described herein.

Example methods may include one or more operations, functions or actions as illustrated by one or more of blocks 622, 624, 626, and/or 628, and may in some embodiments be performed by a computing device such as the computing device 500 in FIG. 5. The operations described in the blocks 622-628 may also be stored as computer-executable instructions in a computer-readable medium such as a computer-readable medium 620 of a computing device 610.

An example process for sending distributed user interface elements to customers may begin with block 622, "RECEIVE AN APPLICATION", where a virtualization server (e.g., the virtualization server 204) may receive an application (e.g., the application 110) from an application provider (e.g., the application provider 102), as described above.

Block 622 may be followed by block 624, "SEPARATE THE APPLICATION INTO MULTIPLE ELEMENTS", where the virtualization server may separate the receive application into multiple, individual application elements, as described above. In some embodiments, the virtualization server may use inactive tags in the received application to guide the separation, or may automatically determine the separation based on element properties in the received application, as described above.

Block 624 may be followed by block 626, "ENCAPSULATE EACH APPLICATION ELEMENT FOR INDIVIDUAL DELIVERY", where the virtualization server may encapsulate each separated application element with one or more virtualization components, as described above. For example, the virtualization components may include a copy of a header associated with the application, one or more distributed user interface controls, event-type variables, or any other suitable injected component, as described above.

Finally, block 626 may be followed by block 628, "PROVIDE THE ENCAPSULATED APPLICATION ELEMENTS TO CUSTOMER DEVICE(S)", where the virtualization server may provide the encapsulated elements to customer devices via an active forwarding module (e.g., the active forwarding module 202), as described above. In some embodiments, the active forwarding module may include an intra-application content forwarding module (e.g., the intra-application content forwarding module 310) to enable the coordination of event-type variables between encapsulated elements on different devices, as described above.

Figure 7:
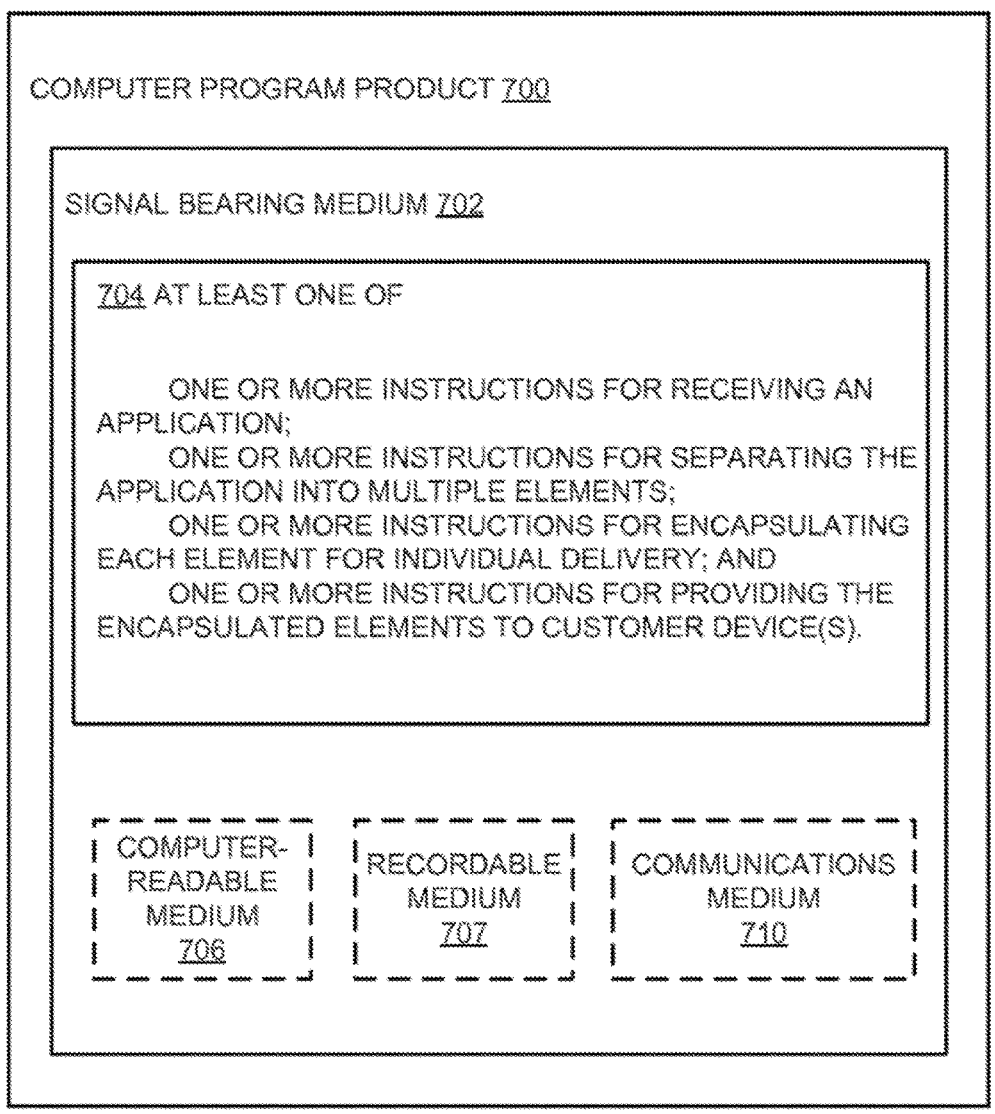
FIG. 7 illustrates a block diagram of an example computer program product, all arranged in accordance with at least some embodiments described herein.

FIG. 7 illustrates a block diagram of an example computer program product, arranged in accordance with at least some embodiments described herein.

In some examples, as shown in FIG. 7, a computer program product 700 may include a signal bearing medium 702 that may also include one or more machine readable instructions 704 that, when executed by, for example, a processor may provide the functionality described herein. Thus, for example, referring to the processor 504 in FIG. 5, the accelerator assembly module 522 may undertake one or more of the tasks shown in FIG. 7 in response to the instructions 704 conveyed to the processor 504 by the signal bearing medium 702 to perform actions associated with integrating hardware accelerators in a datacenter as described herein. Some of those instructions may include, for example, receiving an application, separating the application into multiple elements, encapsulating each element for individual delivery, and/or providing the encapsulated elements to customer device(s), according to some embodiments described herein.

In some implementations, the signal bearing medium 702 depicted in FIG. 7 may encompass computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass recordable medium 707, such as, but not limited to, memory, read/write (R/W) CDs, R/W DVDs, etc. In some implementations, the signal bearing medium 702 may encompass communications medium 710, such as, but not limited to, a digital and/or an analog communication medium (e.g., a fiber optic cable, a waveguide, a wired communications link, a wireless communication link, etc.). Thus, for example, the computer program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some examples, a method is provided to send distributed user interface controls to customers. The method may include receiving an application to be provided to a customer, separating the application into multiple user interface controls, encapsulating at least one of the user interface controls by packaging it with at least one virtualization component, and sending the encapsulated user interface control(s) to a first device associated with the customer.

According to some embodiments, the method may further include receiving the application from an application service provider and/or separating the application into multiple user interface controls based on at least one inactive indicator tag associated with the application. The inactive indicator tag(s) may be received with the application and/or generated. The inactive indicator tag(s) may be generated based on an element bounding box associated with the application and/or a user interface control boundary associated with the application. The virtualization component(s) may include a copy of a header associated with the application and/or at least one distributed-user-interface-related control.

According to other embodiments, the method may further include parsing the application to capture an application appearance and/or an application user interface control location and causing the encapsulated user interface control(s) to be rendered at the first device based on the application appearance and/or the application user interface control location. The method may further include causing the encapsulated user interface control(s) to be rendered at the first device in at least one frame. The method may further include sending each of the encapsulated user interface control(s) in a separate session to the first device, receiving the application in a single session, and/or causing the encapsulated user interface control(s) to detect an interface type associated with the first device and/or provide at least one display instruction for rendering the encapsulated user interface control(s) at the first device.

According to further embodiments, the method may further include sending another encapsulated user interface control to a second device associated with the customer, sending the other encapsulated user interface control based on a customer input, via a temporary uniform resource locator (URL), and/or via a device application executed by the second device. The method may further include determining that the other encapsulated user interface control is associated with a local variable, replacing the local variable with an event-type variable, and forwarding an adjustment to the event-type variable at the second device to the at least one encapsulated user interface control at the first device. The forwarding may be limited based on a number of occurrences and/or a forwarding destination.

According to yet further embodiments, the method may further include implementing receiving the application, separating the application, encapsulating at least one of the multiple user interface controls, and sending the encapsulated user interface control(s) at a proxy, a Web Server Gateway Interface (WSGI) layer module, a datacenter, and/or a separate entity. The method may further include determining whether to send the encapsulated user interface control(s) based on a customer input. The customer input may include a customer toggle control and/or a customer platform login characteristic. The method may further include sending the application to the first device via an alternate delivery path in response to determination not to send the encapsulated user interface control(s).

According to other examples, a system is provided to send distributed user interface controls to customers. The system may include a memory configured to store application user interface data and a virtualization server coupled to the memory. The virtualization server may be configured to receive an application to be provided to a customer, separate the application into multiple user interface controls, encapsulate at least one of the user interface controls by packaging it with at least one virtualization component, and send the encapsulated user interface control(s) to a first device associated with the customer.

According to some embodiments, the virtualization server may be further configured to receive the application from an application service provider and/or separate the application into multiple user interface controls based on at least one inactive indicator tag associated with the application. The inactive indicator tag(s) may be received with the application and/or generated by the virtualization server. The virtualization server may be configured to generate the inactive indicator tag(s) based on an element bounding box associated with the application and/or a user interface control boundary associated with the application. The virtualization component(s) may include a copy of a header associated with the application and/or at least one distributed-user-interface-related control.

According to other embodiments, the virtualization server may be further configured to parse the application to capture an application appearance and/or an application user interface control location and cause the encapsulated user interface control(s) to be rendered at the first device based on the application appearance and/or the application user interface control location. The virtualization server may be further configured to cause the encapsulated user interface control(s) to be rendered at the first device in at least one frame. The virtualization server may be further configured to send each of the encapsulated user interface control(s) in a separate session to the first device, receive the application in a single session, and/or cause the encapsulated user interface control(s) to detect an interface type associated with the first device and/or provide at least one display instruction for rendering the encapsulated user interface control(s) at the first device.

According to further embodiments, the virtualization server may be further configured to send another encapsulated user interface control to a second device associated with the customer, send the other encapsulated user interface control based on a customer input, via a temporary uniform resource locator (URL), and/or via a device application executed by the second device. The virtualization server may be further configured to determine that the other encapsulated user interface control is associated with a local variable, replace the local variable with an event-type variable, and forward an adjustment to the event-type variable at the second device to the at least one encapsulated user interface control at the first device. The forwarding may be limited based on a number of occurrences and/or a forwarding destination.

According to yet further embodiments, the virtualization server may include a proxy and/or a Web Server Gateway Interface (WSGI) layer module. The virtualization server may be located at a datacenter and/or a separate entity. The virtualization server may be further configured to determine whether to send the encapsulated user interface control(s) based on a customer input. The customer input may include a customer toggle control and/or a customer platform login characteristic. The virtualization server may be further configured to send the application to the first device via an alternate delivery path in response to determination not to send the encapsulated user interface control(s).

According to further examples, a virtualization server is provided to send distributed user interface controls to customers. The server may include a processing module and an active forwarding module. The processing module may be configured to receive an application to be provided to a customer, separate the application into multiple user interface controls, and encapsulate at least one of the user interface controls by packaging it with at least one virtualization component. The active forwarding module may be configured to send the encapsulated user interface control(s) to a first device associated with the customer.

According to some embodiments, the processing module may be further configured to receive the application from an application service provider and/or separate the application into multiple user interface controls based on at least one inactive indicator tag associated with the application. The inactive indicator tag(s) may be received with the application and/or generated by the processing module. The processing module may be configured to generate the inactive indicator tag(s) based on an element bounding box associated with the application and/or a user interface control boundary associated with the application. The virtualization component(s) may include a copy of a header associated with the application and/or at least one distributed-user-interface-related control.

According to other embodiments, the processing module may be further configured to parse the application to capture an application appearance and/or an application user interface control location and cause the encapsulated user interface control(s) to be rendered at the first device based on the application appearance and/or the application user interface control location. The processing module may be further configured to cause the encapsulated user interface control(s) to be rendered at the first device in at least one frame. The active forwarding module may be further configured to send each of the encapsulated user interface control(s) in a separate session to the first device. The processing module may be further configured to receive the application in a single session and/or cause the encapsulated user interface control(s) to detect an interface type associated with the first device and/or provide at least one display instruction for rendering the encapsulated user interface control(s) at the first device.

According to further embodiments, the active forwarding module may be further configured to send another encapsulated user interface control to a second device associated with the customer, send the other encapsulated user interface control based on a customer input, via a temporary uniform resource locator (URL), and/or via a device application executed by the second device. The processing module may be further configured to determine that the other encapsulated user interface control is associated with a local variable and replace the local variable with an event-type variable. The active forwarding module may be further configured to forward an adjustment to the event-type variable at the second device to the at least one encapsulated user interface control at the first device. The forwarding may be limited based on a number of occurrences and/or a forwarding destination.

According to yet further embodiments, the processing module and/or the active forwarding module may include a proxy and/or a Web Server Gateway Interface (WSGI) layer module. The processing module and/or the active forwarding module may be located at a datacenter and/or a separate entity. The processing module may be further configured to determine whether to send the encapsulated user interface control(s) based on a customer input. The customer input may include a customer toggle control and/or a customer platform login characteristic. The processing module may be further configured to cause the application to be sent to the first device via an alternate delivery path in response to determination not to send the encapsulated user interface control(s).

According to yet further examples, a computer readable medium may store instructions to send distributed user interface controls to customers. The instructions may include receiving an application to be provided to a customer, separating the application into multiple user interface controls, encapsulating at least one of the user interface controls by packaging it with at least one virtualization component, and sending the encapsulated user interface control(s) to a first device associated with the customer.

According to some embodiments, the method may further include receiving the application from an application service provider and/or separating the application into multiple user interface controls based on at least one inactive indicator tag associated with the application. The inactive indicator tag(s) may be received with the application and/or generated. The inactive indicator tag(s) may be generated based on an element bounding box associated with the application and/or a user interface control boundary associated with the application. The virtualization component(s) may include a copy of a header associated with the application and/or at least one distributed-user-interface-related control.

According to other embodiments, the method may further include parsing the application to capture an application appearance and/or an application user interface control location and causing the encapsulated user interface control(s) to be rendered at the first device based on the application appearance and/or the application user interface control location. The method may further include causing the encapsulated user interface control(s) to be rendered at the first device in at least one frame. The method may further include sending each of the encapsulated user interface control(s) in a separate session to the first device, receiving the application in a single session, and/or causing the encapsulated user interface control(s) to detect an interface type associated with the first device and/or provide at least one display instruction for rendering the encapsulated user interface control(s) at the first device.

According to further embodiments, the method may further include sending another encapsulated user interface control to a second device associated with the customer, sending the other encapsulated user interface control based on a customer input, via a temporary uniform resource locator (URL), and/or via a device application executed by the second device. The method may further include determining that the other encapsulated user interface control is associated with a local variable, replacing the local variable with an event-type variable, and forwarding an adjustment to the event-type variable at the second device to the at least one encapsulated user interface control at the first device. The forwarding may be limited based on a number of occurrences and/or a forwarding destination.

According to yet further embodiments, the method may further include implementing receiving the application, separating the application, encapsulating at least one of the multiple user interface controls, and sending the encapsulated user interface control(s) at a proxy, a Web Server Gateway Interface (WSGI) layer module, a datacenter, and/or a separate entity. The method may further include determining whether to send the encapsulated user interface control(s) based on a customer input. The customer input may include a customer toggle control and/or a customer platform login characteristic. The method may further include sending the application to the first device via an alternate delivery path in response to determination not to send the encapsulated user interface control(s).

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to send distributed user interface controls to customers, the method comprising:
   receiving an application to be provided to a customer;
   separating a user interface of the application into a plurality of user interface controls;
   encapsulating each of the plurality of user interface controls by packaging each user interface control with at least one virtualization component;
   determining that the customer is executing the application simultaneously on a first device and a second device;
   determining a local variable that affects both a first user interface control and a second user interface control among the plurality of user interface controls;
   replacing the local variable with an event-type variable;
   sending the first user interface control to the first device, wherein the first user interface control is encapsulated with a corresponding virtualization component and the event-type variable;
   sending the second user interface control to the second device, wherein the second user interface control is encapsulated with a corresponding virtualization component and the event-type variable; and
   in response to a modification of the event-type variable, forwarding the modification to the first device and the second device.

2. The method of claim 1, further comprising separating the application, into the plurality of user interface controls based on at least one inactive indicator tag associated with the application, wherein the at least one inactive indicator tag is one of received with the application and/or generated.

3. The method of claim 2, further comprising generating the at least one inactive indicator tag based on an element hounding box associated with the application and/or a user interface control boundary associated with the application.

4. The method of claim 1, further comprising:
parsing the application to capture at least one of an application appearance and an application user interface control location; and
causing the first user interface control to he rendered at the first device based on at least one of the application appearance and the application user interface control location.

5. The method of claim 4, further comprising causing the first user interface control to be rendered at the first device in at least one frame.

6. The method of claim 1, further comprising sending each of the first user interlace control and one or mom additional encapsulated user interface controls in a separate session to the first device.

7. The method of claim 6, further comprising receiving the application in a single session.

8. The method of claim 1, further comprising causing the first user interface control to detect an interface type associated with the first device and/or provide at least one display instruction for rendering the first user interface control at the first device.

9. A system to send distributed user interface controls to customers, the system comprising:
a memory configured to store application user interface data; and
a virtualization server coupled to the memory and configured to:
receive an application to he provided to a customer;
provide to be displayed a selectable option to separate and encapsulate a user interface of the application to a first device; and
in response to a selection of the option:
separate the user interface of the application into a plurality of user interface controls;
encapsulate each of the plurality of user interface controls by packaging each user interface control with at least one virtualization component;
determine that the customer is executing the application simultaneously on the first device and a second device;
send a first user interface control to the first device, wherein the first user interface control is encapsulated with a corresponding virtualization component; and
send a second user interface control to the second device, wherin the second user interface control is encapsulated with a corresponding virtualization component.

10. The system of claim 9, wherein the virtualization server is further configured to receive the application from an application service provider.

11. The system of claim 9, wherein the at least one virtualization component includes one or more of a copy of a header associated with the application and at least one distributed-user-interface-related control, wherein a parameter of the header includes information for execution of the application.

12. The system of claim 9, wherein the virtualization server is further configured to send the second user interface control based on a customer input.

13. The system of claim 9, wherein the virtualization server is further configured to send the second user interface via a temporary uniform resource locator (URL) and/or a device application executed by the second device.

14. The system of claim 9, wherein the virtualization server is further configured to:
determine that the second user interface control includes a local variable that affects both the first user interface control and the second user interface control among the plurality of user interface controls;
replace the local variable with an event-type variable; and
forward an adjustment to the event-type variable at the second device to the first device.

15. The system of claim 14, wherein the virtualization server is further configured to limit the forwarding based on a number of occurrences and/or a forwarding destination.

16. A virtualization server configured to send distributed user interface controls to customers, the virtualization server comprising:
a processing module configured to:
receive an application to be provided to a customer;
provide to he displayed a selectable option to separate and encapsulate a user interface of the application to a first device; and
in response to a selection of the option:
separate the user interface of the application into a plurality of user interface controls;
encapsulate each of the plurality of user interlace controls by packaging each user interface control with at least one virtualization component;
determine that the customer is executing the application simultaneously on the first device and a second device;
determine a local variable that affects both a first user interface control and a second user interface control among the plurality of user interface controls; and
replace the local variable with an event-type variable; and
an active forwarding module configured to:
send the first encapsulated user interface control to the first device, wherein the first user interface control is encapsulated with a corresponding virtualization component and the event-type variable;
send the second encapsulated user interface control to the second device, wherein the second user interface control is encapsulated with a corresponding virtualization component and the event-type vasriable; and
in response to a modification of the event-type variable, forwarding the modification to the first device and the second device.

17. The virtualization server of claim 16, wherein the processing module and/or the active forwarding module includes a proxy and/or a Web Server Gateway Interface (WSGI) layer module.

18. The virtualization server of claim 16, wherein the processing module and/or the active forwarding module is located at a datacenter and/or a separate entity.

19. The virtualization server of claim 16, wherein the processing module is further configured to determine whether to send the first user interface control based on a customer input, the customer input including a customer toggle control and/or a customer platform login characteristic.

20. The virtualization server of claim 19, wherein the processing module is further configured to cause the application to be sent to the first device via an alternate delivery path in response to determination not to send the first user interface control.

* * * * *

UNITED STATES PATENT AND TRADEMARK OFFICE
CERTIFICATE OF CORRECTION

PATENT NO. : 9,565,075 B2  
APPLICATION NO. : 14/373026  
DATED : February 7, 2017  
INVENTOR(S) : Kruglick Page 1 of 1

It is certified that error appears in the above-identified patent and that said Letters Patent is hereby corrected as shown below:

In Column 1, Line 8, delete "§371" and insert -- § 371 --, therefor.

In Column 13, Lines 5-6, delete "control (s)" and insert -- control(s) --, therefor.

In Column 19, Line 2, in Claim 2, delete "application, into" and insert -- application into --, therefor.

In Column 19, Line 8, in Claim 3, delete "hounding box" and insert -- bounding box --, therefor.

In Column 19, Line 14, in Claim 4, delete "he rendered" and insert -- be rendered --, therefor.

In Column 19, Line 22, in Claim 6, delete "user interlace control and one or mom" and insert -- user interface control and one or more --, therefor.

In Column 19, Line 38, in Claim 9, delete "he provided" and insert -- be provided --, therefor.

In Column 19, Line 56, in Claim 9, delete "wherin" and insert -- wherein --, therefor.

In Column 20, Line 26, in Claim 16, delete "he displayed" and insert -- be displayed --, therefor.

In Column 20, Line 33, in Claim 16, delete "user interlace" and insert -- user interface --, therefor.

In Column 20, Line 53, in Claim 16, delete "vasriable;" and insert -- variable; --, therefor.

Signed and Sealed this  
Second Day of May, 2017

Michelle K. Lee  
*Director of the United States Patent and Trademark Office*